United States Patent
Ohshima et al.

(10) Patent No.: US 6,462,861 B2
(45) Date of Patent: *Oct. 8, 2002

(54) OPTICAL AMPLIFYING APPARATUS AND OPTICAL COMMUNICATION SYSTEM

(75) Inventors: Chihiro Ohshima; Yasushi Sugaya, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/861,634

(22) Filed: May 22, 2001

(65) Prior Publication Data

US 2002/0041431 A1 Apr. 11, 2002

Related U.S. Application Data

(63) Continuation of application No. PCT/JP00/06101, filed on Sep. 7, 2000.

(51) Int. Cl.[7] ................................................. H01S 3/00
(52) U.S. Cl. ....................................... 359/334; 359/337
(58) Field of Search ................................. 359/334, 337, 359/341.4

(56) References Cited

U.S. PATENT DOCUMENTS

2001/0024304 A1 * 9/2001 Okuno et al. ................ 359/124

FOREIGN PATENT DOCUMENTS

EP 0 647 000 A1 * 5/1995

* cited by examiner

Primary Examiner—Mark Hellner
(74) Attorney, Agent, or Firm—Staas & Halsey LLP

(57) ABSTRACT

The present invention aims at providing an optical amplifying apparatus constituted by combining Raman amplifiers, in which deterioration of a signal/noise ratio of output light is prevented to thereby improve the transmission characteristic of signal light, and an optical communication system utilizing such an optical amplifying apparatus. To this end, the optical amplifying apparatus according to the present invention comprises: first optical amplifying means for supplying excitation light to a Raman amplifying medium to thereby Raman amplify signal light; second optical amplifying means for amplifying the signal light output from the first optical amplifying means; and controlling means for controlling an operating state of the first optical amplifying means or the second optical amplifying means, so that a signal/noise ratio of the signal light to be output from the second optical amplifying means is kept substantially constant. The controlling means obtains a signal/noise ratio concerning an output light from the second optical amplifying means, based on a noise light component due to Raman amplification calculated in accordance with Raman excitation light power and to signal information in a preceding stage optical amplifying apparatus, and a noise light component calculated in accordance with input light power into the second optical amplifying means and to the signal information in the preceding stage optical amplifying apparatus, to control, for example, output setting levels of the first and second optical amplifying means, so that the obtained signal/noise ratio is kept substantially constant irrespective of the number of channel wavelengths of the signal light.

40 Claims, 9 Drawing Sheets

OPTICAL AMPLIFYING APPARATUS AND OPTICAL COMMUNICATION SYSTEM

This application is a continuation of PCT/JP00/06101, filed on Sep. 7, 2000.

TECHNICAL FIELD OF THE INVENTION

The present invention relates to an optical amplifying apparatus constituted by combining Raman amplifiers for amplifying signal light, and an optical communication system utilizing such an optical amplifying apparatus.

BACKGROUND ART

In a typical optical communication system as shown in the lower half of FIG. 9, an optical sender (OS) and an optical receiver (OR) are connected by a transmission path, and a plurality of optical repeaters are arranged in the transmission path at required intervals so that signal light repeatedly transmit from the optical sender to the optical receiver. Each of the optical repeaters of this optical communication system is provided with an optical amplifying apparatus including, for example, an erbium-doped optical fiber amplifier (EDFA) and the like so that wavelength-division multiplexed (WDM) signal light including a plurality of optical signals having wavelengths different from one another is collectively amplified.

In the optical amplifying apparatus adopting the aforementioned EDFA, Amplified Spontaneous Emission (ASE) light is generated as the input signal light is amplified, and this ASE light is added to the amplified signal light to be output from the optical amplifying apparatus. In the aforementioned optical amplifying apparatus, total output light power is controlled to be constant, in case of conducting an automatic level control (ALC) such that output light power per single channel wavelength has a predetermined value. As a result, in the optical amplifying apparatus adopting the EDFA, an ASE light component acts as an error component relative to a signal light component to be controlled to a constant level. This error component reduces light power per single channel wavelength of the signal light to be output from the optical amplifying apparatus.

Therefore, with the aforementioned optical communication system, as shown in the upper half of FIG. 9, there has been a problem in that the input signal light power into each succeeding optical amplifying apparatus (a k-th stage in the figure) is reduced whenever the WDM signal light is repeatedly amplified by each preceding optical amplifying apparatus, resulting in deterioration of an optical SN ratio at the optical receiver side. Generally, since an optical amplifying apparatus to be used in a WDM optical communication system has a broadband characteristic, if the number of channel wavelengths of the WDM signal light is used as single channel wavelength, a reduction amount of signal light power due to the ASE light becomes large. To cope with such a reduction of the signal light power when the number of signal light wavelengths is smaller, it may be conceivable to design the system, for example, by previously estimating the deterioration of the signal/noise ratio (SNR) at a smaller number of channel wavelengths of the signal light. However, this reduces a system gain, to thereby problematically reduce a transmittable distance of the system.

To prevent the aforementioned problem, in conventional optical communication systems, a so-called ASE correction (see the upper half of FIG. 9) has been conducted in a manner to calculate the ASE light power by utilizing those information concerning such as a noise figure (NF), input light power, a bandwidth and the number of channel wavelengths of the signal light of an optical amplifying apparatus, so as to increase an output light setting level by an amount corresponding to the calculated ASE light power.

Meanwhile, there has been recently promoted development of an optical amplifying apparatus aiming at spreading an optical amplifying band and at reducing a repeat-loss, by combining an EDFA with a Raman amplifier. In such an optical amplifying apparatus utilizing Raman amplification, noise light due to Raman amplification is generated in addition to the aforementioned ASE light, and this noise light is added to the amplified signal light to be output.

The aforementioned noise light due to Raman amplification is generally called "Raman scattering light due to pumping light", since such noise light is generated even when only Raman excitation light is input into an amplifying medium in a state where no signal light is input into the amplifying medium. Here, the noise light to be generated in the Raman amplifier shall be called "Amplified Spontaneous Raman Scattering (ASS) light", in contrast to the Amplified Spontaneous Emission (ASE) light to be generated in an EDFA.

Generation and accumulation of such ASS light causes the same problem as the aforementioned ASE light, in an optical communication system. Thus, it is difficult to prevent deterioration of an optical SN ratio at an optical receiver side, by simply applying the aforementioned conventional ASE correction to an optical amplifying apparatus adopting a combination of an EDFA with a Raman amplifier, thereby requiring a correction also taking account of an influence of ASS light.

The present invention has been carried out in view of the conventional problems as described above, and it is therefore an object of the present invention to provide an optical amplifying apparatus combined with a Raman amplifier for preventing deterioration of a signal/noise ratio of output light, to thereby improve a transmission characteristic of signal light, and an optical communication system utilizing such an apparatus.

DISCLOSURE OF THE INVENTION

To achieve the above object, a first aspect of the optical amplifying apparatus according to the present invention comprises: first optical amplifying means for supplying excitation light to a Raman amplifying medium to thereby Raman amplify signal light propagated through the Raman amplifying medium; and second optical amplifying means for amplifying the signal light output from the first optical amplifying means, wherein the optical amplifying apparatus further comprises controlling means for controlling an operating state of at least one of the first optical amplifying means and the second optical amplifying means, so that a signal/noise ratio of the signal light to be output from the second optical amplifying means is kept substantially constant. Concretely, the signal/noise ratio of the signal light to be output from the second optical amplifying means may be controlled to be substantially constant, irrespective of a noise amount caused in the first optical amplifying means, or irrespective of the number of channel wavelengths of the signal light.

According to such a constitution, one or both of the operating states of the Raman amplification in the first optical amplifying means and the optical amplification in the second optical amplifying means is/are adjusted by the controlling means, so that the signal/noise ratio of the signal light to be output from the second optical amplifying means is controlled to be substantially constant. Thus, it becomes possible to prevent deterioration of the signal/noise ratio due to an influence of noise light generated in the first and second optical amplifying means.

Further, a second aspect of the optical amplifying apparatus according to the present invention comprises: first optical amplifying means for supplying excitation light to a Raman amplifying medium to thereby Raman amplify signal light propagated through the Raman amplifying medium; and second optical amplifying means for amplifying the signal light output from the first optical amplifying means, in which output light of at least one of the first optical amplifying means and the second optical amplifying means is controlled to be a previously determined output setting level, wherein the optical amplifying apparatus further comprises: detecting means for detecting excitation light power to be supplied to the Raman amplifying medium; calculating means for calculating a noise light component due to the first optical amplifying means, based on a detection result by the detecting means; and output setting level correcting means for correcting the output setting level based on a calculation result by the calculating means, to keep signal light power per single channel wavelength included in the output light to be constant, irrespective of the number of channel wavelengths of the signal light.

According to such a constitution, the noise light component due to the first optical amplifying means, i.e., the power of the Amplified Spontaneous Raman Scattering (ASS) light, is calculated by the calculating means based on the excitation light power for Raman amplification detected by the detecting means. Then, the previously determined output setting level of one or both of the first and second optical amplifying means is corrected by the output setting level correcting means based on the calculated ASS light power. Thus, the signal light power per single channel wavelength included in the output light controlled in accordance with the corrected output setting level is kept constant irrespective of the number of channel wavelengths of the signal light, so that the signal/noise ratio of the signal light can be controlled to be substantially constant.

A third aspect of the optical amplifying apparatus according to the present invention comprises: first optical amplifying means for supplying excitation light to a Raman amplifying medium to thereby Raman amplify signal light propagated through the Raman amplifying medium; and second optical amplifying means for amplifying the signal light output from the first optical amplifying means, wherein the optical amplifying apparatus further comprises: detecting means for detecting excitation light power to be supplied to the Raman amplifying medium; calculating means for calculating a noise light component due to the first optical amplifying means, based on a detection result by the detecting means; and transfer means for transferring a calculation result by the calculating means to the second optical amplifying means.

According to such a constitution, the noise light component due to the first optical amplifying means, i.e., the power of the Amplified Spontaneous Raman Scattering (ASS) light, is calculated by the calculating means based on the excitation light power for Raman amplification detected by the detecting means, and the calculation result is transferred to the second optical amplifying means by the transfer means. Thus, in the second optical amplifying means, it becomes possible to conduct an output correction taking account of an influence of the ASS light.

As a specific configuration of the optical amplifying apparatus according to the first aspect, the controlling means may comprise: an excitation light power detecting section for detecting the excitation light power to be supplied to the Raman amplifying medium; an input light power detecting section for detecting input light power into the second optical amplifying means; control information receiving section for receiving information concerning a signal/noise ratio at a preceding stage optical amplifying apparatus; and a calculation controlling section for obtaining the signal/noise ratio of the signal light to be output from the second optical amplifying means, based on the noise light component due to the first optical amplifying means calculated corresponding to the detection result by the excitation light power detecting section and to the information received by the control information receiving section, and based on a noise light component due to the second optical amplifying means calculated corresponding to the detection result by the input light power detecting section and to the information received by the control information receiving section, and for controlling the operating state of at least one of the first optical amplifying means and the second optical amplifying means, corresponding to the thus obtained signal/noise ratio.

According to such a constitution, a caused amount of the noise light component due to the Raman amplification is calculated by the calculation controlling section, corresponding to the Raman excitation light power detected by the excitation light power detecting section and the information concerning the signal/noise ratio (preferably, the information including the signal/noise ratio and the number of multiplexed channel wavelengths for the signal light) at the preceding stage optical amplifying apparatus, received by the control information receiving section. Further, a caused amount of the noise light component due to the amplification by the second optical amplifying means is calculated by the calculation controlling section, corresponding to the input light power into the second optical amplifying means detected by the input light power detecting section and the information received by the control information receiving section. Then, the signal/noise ratio of the signal light to be output from the second optical amplifying means is obtained, based on the calculated respective noise light components, the operating state of at least one of the first and second optical amplifying means is adjusted, corresponding to the thus obtained signal/noise ratio, and the signal/noise ratio of the signal light to be output from the second optical amplifying means is controlled to be substantially constant.

Further, when the first optical amplifying means or the second optical amplifying means includes a constant-output controlling section for controlling total power of the output light to be constant, the controlling means of the optical amplifying apparatus may control the output setting level of the constant-output controlling section. In addition, the controlling means may control setting of an amplification gain in the second optical amplifying means.

Moreover, the second optical amplifying means of the optical amplifying apparatus may comprise an optical fiber amplifier adopting a rare earth element doped optical fiber. As a specific configuration in this case, it is possible to connect in series a plurality of optical amplifying sections having substantially the same amplifying wavelength band, or to connect in parallel a plurality of optical amplifying sections having different amplifying wavelength bands. In the above constitution, the caused amount of the Amplified Spontaneous Emission light (ASE light) due to the optical fiber amplifier adopting the rare earth element doped optical fiber is to be calculated by the controlling means.

The optical communication system according to the present invention is constituted to include a plurality of optical repeaters, each having the aforementioned optical amplifying apparatus, arranged in a transmission path connecting an optical sender and an optical receiver. According to such a constitution, the signal light having the signal/noise ratio controlled to be substantially constant is output from each optical repeater and repeatedly transmitted, to thereby provide excellent receiving sensitivity at the optical receiver.

BEST MODE FOR CARRYING OUT THE INVENTION

There will be described hereinafter embodiments of an optical amplifying apparatus and an optical communication system according to the present invention, with reference to the accompanying drawings.

Figure 1:
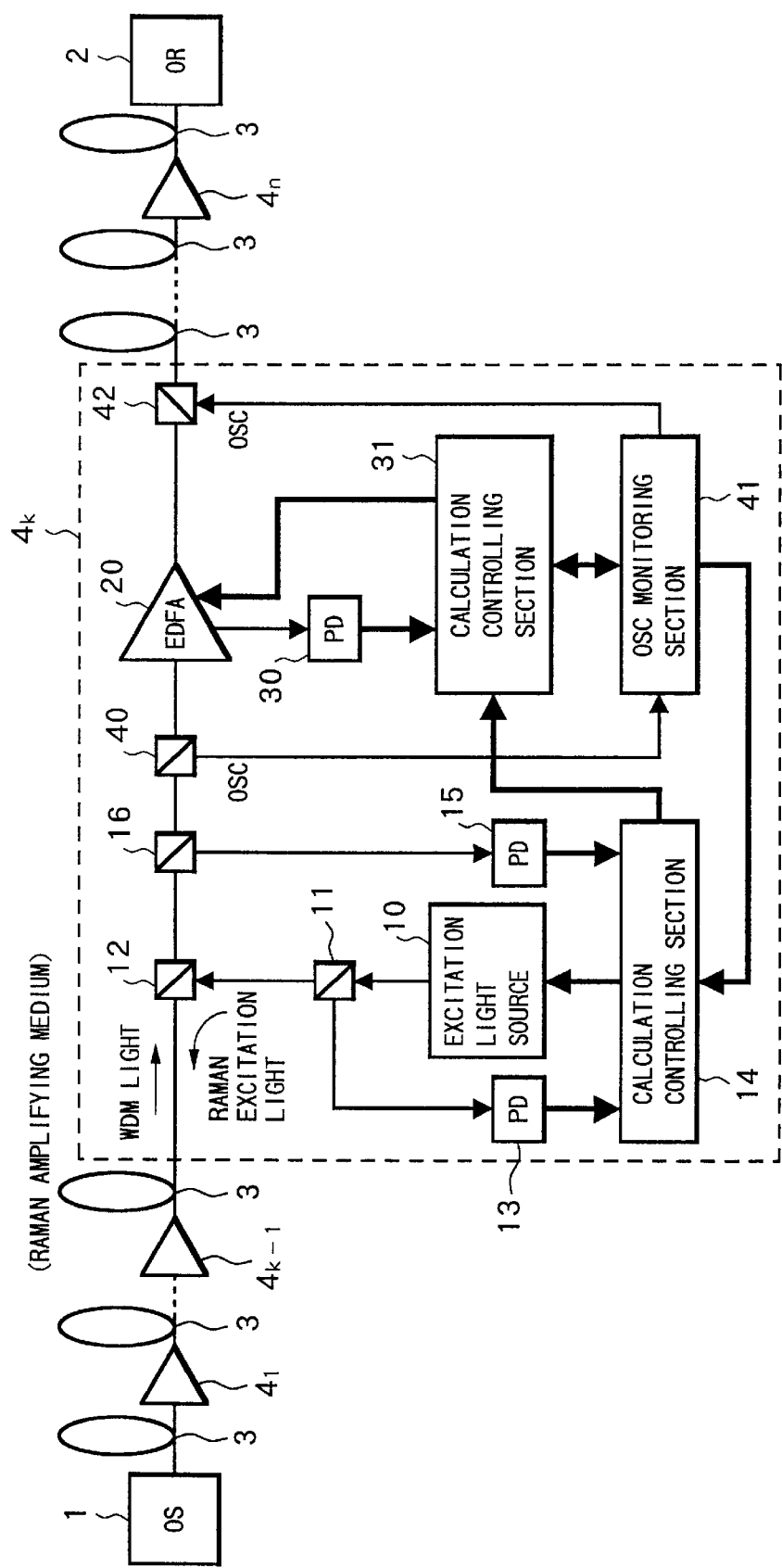
FIG. 1 is a block diagram showing an essential constitution of an optical communication system according to a first embodiment of the present invention.

FIG. 1 is a block diagram showing an essential constitution of a WDM optical communication system according to a first embodiment of the present invention.

In FIG. 1, with the WDM optical communication system of this embodiment, an optical sender (OS) 1 and an optical receiver (OR) 2 are connected by a transmission path 3, and n numbers of optical repeaters $4_1, \ldots, 4_{k-1}, 4_k, \ldots, 4_n$ are arranged in the transmission path 3 at required intervals, so that WDM signal light is repeatedly transmitted from the optical sender 1 to the optical receiver 2.

The optical sender 1 is a general optical transmitting terminal for generating WDM signal light obtained by multiplexing a plurality of optical signals having different wavelengths to transmit the WDM signal light to the transmission path 3. The optical receiver 2 is also a general optical receiving terminal for receiving the WDM signal light transmitted from the optical sender 1 via the transmission path 3 and the optical repeaters $4_1$ to $4_n$, and for demultiplexing the WDM signal light into optical signals of respective wavelengths to thereby conduct a receiving procedure.

The transmission path 3 connects among the optical sender 1, optical repeaters $4_1$ to $4_n$ and optical receiver 2 to thereby propagate the WDM signal light. Further, the transmission path 3 in each repeating segment is supplied with excitation light to be output from a signal light input end of the optical repeater positioned at a receiving side, and acts as a Raman amplifying medium.

Each of the optical repeaters $4_1$ to $4_n$ is provided with an optical amplifying apparatus applied with the present invention. The optical amplifying apparatus has a basic constitution that combines a Raman amplifier (first optical amplifying means) with for example an EDFA (second optical amplifying means) as a rare earth element doped optical fiber amplifier. FIG. 1 shows a specific configuration of the optical amplifying apparatus within the optical repeater $4_k$ at the k-th stage. The configuration of each optical amplifying apparatus within optical repeaters other than the optical repeater at the k-th stage is the same as that at the k-th stage. Although the optical amplifying apparatus applied with the present invention is provided in each of the optical repeaters $4_1$ to $4_n$ here, the optical communication system according to the present invention is not limited to such a constitution. Namely, it is possible to adopt such a constitution that the optical amplifying apparatus applied with the present invention is provided to at least one of the plurality of optical repeaters.

For example, the optical amplifying apparatus of each of the optical repeaters $4_1$ to $4_n$ includes: an excitation light source 10, optical couplers 11, 12, 16, photodetectors (PD) 13, 15, and a calculation controlling section 14, as constituent elements at the Raman amplifier side; an EDFA 20, a photodetector (PD) 30 and a calculation controlling section 31, as constituent elements at the EDFA side; and optical couplers 40, 42 and an OSC monitoring section 41, as constituent elements for processing an optical supervisory channel (OSC) to be sent and received among the optical repeaters.

The excitation light source 10 generates excitation light for Raman amplification (hereinafter called "Raman excitation light") having a previously set wavelength corresponding to the wavelength band of the WDM signal light to be transmitted, to supply this excitation light to the transmission path 3 via optical couplers 11, 12. The optical coupler 11 is for branching a part of the Raman excitation light output from the excitation light source 10, to transmit the branched light to the PD 13. The optical coupler 12 is for supplying the Raman excitation light passed through the optical coupler 11 to the transmission path 3 from the signal light input end of the optical repeater, and for passing the WDM signal light from the transmission path 3 to the EDFA 20 side. Here, the Raman excitation light is propagated in a direction opposite to the WDM signal light, and the transmission path 3 connected to the signal light input end acts as the Raman amplifying medium, so that a so-called distributed Raman amplifier (DRA) for Raman amplifying the WDM signal light propagated through the transmission path 3 is constructed.

The optical coupler 16 is arranged between the optical coupler 12 and the EDFA 20, so as to branch a part of the Raman amplified WDM signal light to transmit the branched light to the PD 15. The PD 15 monitors power of the Raman amplified WDM signal light based on the branched light from the optical coupler 16, and outputs a monitoring result to the calculation controlling section 14. Further, the PD 13 monitors power of the Raman excitation light output from the excitation light source 10 based on the branched light from the optical coupler 11, and outputs a monitoring result to the calculation controlling section 14. Note, it is possible to substitute the PD 15 by the PD 30 for monitoring input light power of the EDFA 20, and to output a monitoring result of the PD 30 to the calculation controlling section 14.

The calculation controlling section 14 calculates total power of the Amplified Spontaneous Raman Scattering light (ASS light) being a noise component due to Raman amplification, based on the Raman excitation light power from the PD 13, and further calculates a correction ratio and an output correction amount corresponding to the ASS light, making use of the calculation result of the total power as well as various information sent from the OSC monitoring section 41. In accordance with the calculated output correction amount, the calculation controlling section 14 adjusts the driving condition of the excitation light source 10, and transfers the calculation results thereof to the calculation controlling section 31 at the EDFA side. Here, the calculation controlling section 14 has functions as calculating means, output setting level correcting means and transfer means. Note, the calculation procedure at the calculation controlling section 14 and the adjusting procedure for the excitation light source 10 will be described later.

Figure 2:
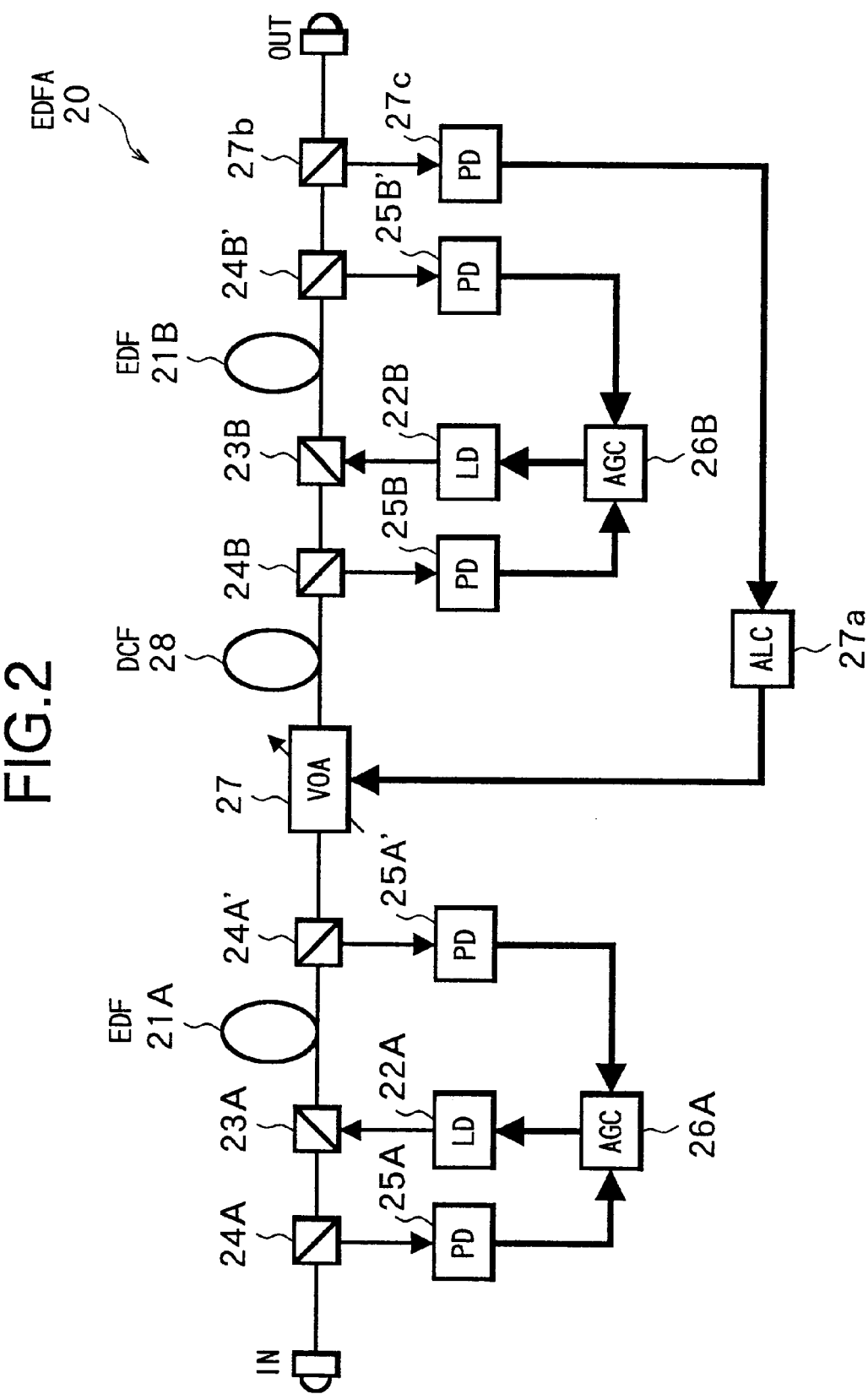
FIG. 2 is a block diagram showing an exemplary specific configuration of an EDFA in the first embodiment of the present invention.

The EDFA 20 is one having a typical constitution for amplifying the WDM signal light passed through the optical couplers 12, 40 up to a required level, to output the thus amplified light. FIG. 2 is a block diagram showing an exemplary specific configuration of the EDFA 20.

In the EDFA 20 shown in the exemplary configuration of FIG. 2, two optical amplifying sections adopting such as erbium doped fibers (EDF) are connected in series, and a variable optical attenuator (VOA) 27 and a dispersion compensation fiber (DCF) 28 are inserted between the preceding stage optical amplifying section and the succeeding stage optical amplifying section.

The preceding stage optical amplifying section includes an EDF 21A, an excitation light source (LD) 22A, optical couplers 23A, 24A, 24A', photodetectors (PD) 25A, 25A', and an AGC circuit 26A. The EDF 21A is input with the WDM signal light passed through an input terminal IN and the optical couplers 24A, 23A. This EDF 21A is supplied with the excitation light from the excitation light source 22A via the optical coupler 23A to be brought into an excited state. The wavelength band of the excitation light to be generated by the excitation light source 22A is set, for example, at a 980 nm band or 1.480 nm band for WDM signal light of a 1.550 nm band. The driving condition of this excitation light source 22A is controlled by the AGC circuit 26A. The AGC circuit 26A is transferred with input light power into the preceding stage optical amplifying section, to be detected by the optical coupler 24A and PD 25A, and output light power from the preceding stage optical amplifying section, to be detected by the optical coupler 24A' and PD 25A'. An automatic control of the excitation light power to be generated at the excitation light source 22A is performed so that a gain at the preceding stage optical amplifying section is kept constant.

The succeeding stage optical amplifying section includes an EDF 21B, an excitation light source (LD) 22B, optical couplers 23B, 24B, 24B', photodetectors (PD) 25B, 25B', and an AGC circuit 26B. These components are the same as those corresponding components in the preceding stage optical amplifying section.

The variable optical attenuator 27 attenuates the WDM signal light output from the preceding stage optical amplifying section, to output the attenuated light to the dispersion compensation fiber 28. An optical attenuation amount of the variable optical attenuator 27 is controlled by an ALC circuit 27a. The ALC circuit 27a is transferred with output light power from the succeeding stage optical amplifying section, to be detected by an optical coupler 27b and a photodetector 27c. An automatic control of the optical attenuation amount of the variable optical attenuator 27 is performed so that total output light power from the EDFA 20 is kept constant in accordance with the setting level. The dispersion compensation fiber 28 is to compensate for wavelength dispersion characteristics of the transmission path 3 connected to the optical repeater.

The PD 30 (FIG. 1) monitors input light power to be input into the aforementioned EDFA 20, to output the monitoring result to the calculation controlling section 31. Note, the PD 30 may be substituted by the PD 25A of FIG. 2. The calculation controlling section 31 calculates a correction ratio and an output correction amount corresponding to the ASS light and the ASE light, making use of the input light power into the EDFA 20 transferred from the PD 30, the calculation result of the calculation controlling section 14 at the Raman amplifier side, and the various information sent from the OSC monitoring section 41, and adjusts the driving condition of the EDFA 20, in accordance with the output correction amount. Note, the calculation procedure at the calculation controlling section 31 and the adjusting procedure for the EDFA 20 will be described later.

The OSC monitoring section 41 extracts the optical supervisory channel light multiplexed into the WDM signal light and sent from the optical repeater at the preceding stage, such as by the optical coupler 40 inserted prior to the EDFA 20, identifies the information included in the optical supervisory channel light, concerning the correction ratio at the preceding stage optical repeater, the number of channel wavelengths of the WDM signal light and the like; and transfers the information to the calculation controlling sections 14, 31, respectively. Further, the OSC monitoring section 41 generates the optical supervisory channel light including the information concerning the correction ratio in the own optical repeater calculated at the calculation controlling section 31, and the number of channel wavelengths of the WDM signal light, multiplexes the thus generated optical supervisory channel light into the WDM signal light via the optical coupler 42 inserted after the EDFA 20, and transmits the thus multiplexed light to the succeeding stage optical repeater.

There will be described hereinafter the operation of the first embodiment.

Firstly, there will be concretely explained calculation procedures at the calculation controlling sections 14, 31 of each of the optical repeaters $4_1$ to $4_n$.

Figure 3:
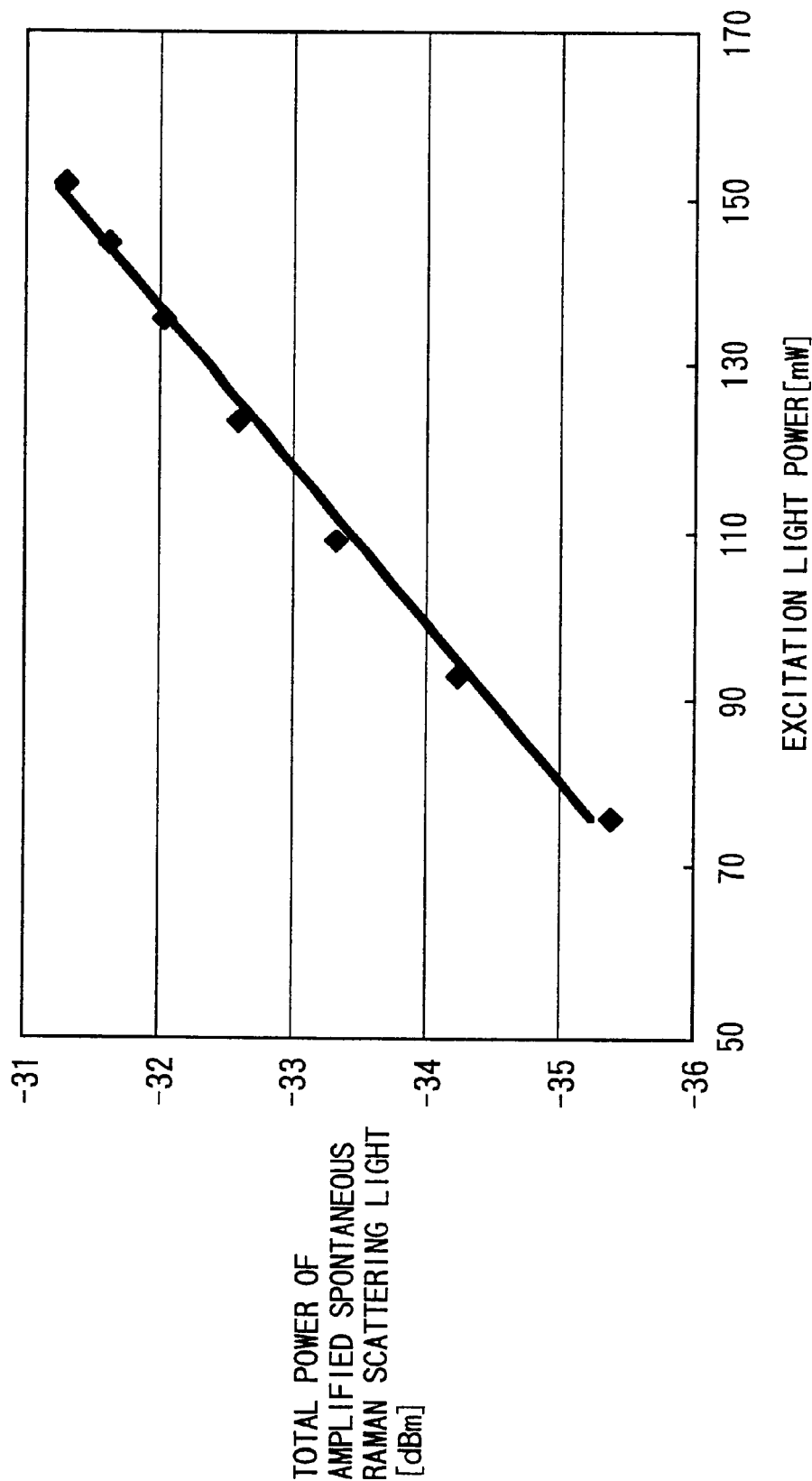
FIG. 3 is a graph showing a relationship between total power of Amplified Spontaneous Raman Scattering light caused by excitation light, which becomes a noise component at the time of Raman amplification; and excitation light power for Raman amplification.

As described above, the calculation controlling section 14 at the Raman amplifier side calculates the total power of the ASS light based on the power of the Raman excitation light, to thereby calculate the correction ratio and the output correction amount corresponding to the ASS light. It has been experimentally confirmed that the total power of the ASS light (noise component) to be generated by Raman amplification varies with respective to the power of the Raman excitation light, in accordance with a relationship, for example, as shown in FIG. 3. By formulating such a relationship by antilogarithm values, the ASS light total power Ass [mW] can be represented by the following equation (1):

$$Ass = m_1 \cdot 10^{\frac{a_{11} \cdot Pu_1 + a_{10}}{10}} + m_2 \cdot 10^{\frac{a_{21} \cdot Pu_2 + a_{20}}{10}} + \cdots + m_i \cdot 10^{\frac{a_{i1} \cdot Pu_i + a_{i0}}{10}} \qquad (1)$$

wherein: $Pu_1$ to $Pu_i$ represent Raman excitation light power [mW] to be generated at each of the excitation light sources in a case where i pieces of Raman amplification excitation light sources having different wavelengths are provided (i=1 in this embodiment); $m_1$ to $m_i$ represent weighting constants corresponding to the excitation light sources, respectively; and $a_{11}$, $a_{10}$ to $a_{i1}$, $a_{i0}$ represent constants (calculation equation coefficients) when approximating the relationship shown in FIG. 3 by a linear function. Although the relationship between the total power of the ASS light and the total power of the Raman excitation light is approximated by the linear function here, it is also possible to approximate it by a quadratic function or a higher order function, to thereby improve the precision.

When the ASS light total power Ass is calculated making use of the Raman excitation light power measured at the PD 13 in accordance with the relationship given by the equation (1), then a calculation of the correction ratio $b_k$ corresponding to the ASS light in the own optical repeater (such as the k-th stage) is performed. This correction ratio $b_k$ represents a ratio of the noise light component (ASS light component) due to Raman amplification to the signal light component, and thus is a value corresponding to an inverse number of an optical SN ratio corresponding to the Raman amplification. Concretely, the correction ratio $b_k$ can be represented by the following equation (2), making use of a correction ratio $b_{k-1}$ of the preceding stage optical repeater and the number of channel wavelengths of the WDM signal light "wave" transferred from the applicable OSC monitoring section 41, a bandwidth BW previously set in the Raman amplifier, and total power PTin (i.e., total input light power into the EDFA 20) of the Raman amplified WDM signal light to be measured by the PD 15:

$$b_K = \frac{Ass \cdot wave \cdot \left(\frac{0.1}{BW} + \frac{d_{k-1}}{wave}\right)}{10^{PTin/10} - Ass}. \qquad (2)$$

The correction ratio $b_k$ calculated in accordance with the equation (2) is transferred to the calculation controlling section 31 at the EDFA 20 side. Further, an output correction amount $E_k$ of the Raman amplifier is calculated at the calculation controlling section 14 at the Raman amplifier side, making use of the calculated correction ratio $b_k$. This output correction amount $E_k$ is a correction amount corresponding to a reduction amount of the signal light component due to the generation of the ASS light, and can be calculated by using the relationship represented by the following equation (3):

$$E_k = 10 \cdot \log\left(1 + \frac{(d_{k-1} + b_k) \cdot 10 \cdot BW}{wave}\right). \qquad (3)$$

Based on the output correction amount $E_k$ calculated in accordance with the equation (3), the operating state of the Raman amplifier is controlled at the calculation controlling section 14. Concretely, when the driving condition of the excitation light source 10 is being controlled so that the total power of the Raman amplified WDM signal light is kept constant at a previously determined output setting level, the output setting level is adjusted so as to correspond to the output correction amount $E_k$. In this way, the driving condition of the excitation light source 10 is controlled so that the total output light power as a Raman amplifier is kept constant at a level where the influence due to the generation of noise light is corrected.

Meanwhile, in the calculation controlling section 31 at the EDFA side, a correction ratio $c_k$ corresponding to the noise component (ASE light) of the EDFA 20 is calculated, by making use of the total power PTin of the EDFA 20 to be measured at the PD 30, and a noise figure NF of the EDFA 20 which has been previously measured and duly stored. Then, a correction ratio $d_k$ for the whole of the own optical repeater is calculated, by making use of the above calculated correction ratio $c_k$, the correction ratio $b_k$ calculated by the calculation controlling section 14 at the Raman amplifier side, and a correction ratio $d_{k-1}$ of the preceding stage optical repeater to be transferred from the OSC monitoring section 41.

In calculating the correction ratio $c_k$, firstly, an output correction amount $E_{k-1}'$ of EDFA at the preceding stage optical repeater $4_{k-1}$ is calculated in accordance with the relationship of the following equation (4), by making use of the correction ratio $d_{k-1}$ transferred from the OSC monitoring section 41:

$$E_{K-1}' = 10 \cdot \log\left(1 + \frac{d_{k-1} \cdot 10 \cdot BW}{wave}\right). \qquad (4)$$

It is noted that both of initial values $E_0'$ and $d_0$ of the output correction amount $E_{k-1}'$ and correction ratio $d_{k-1}$ are zero.

When the output correction amount $E_{k-1}'$ of the EDFA at the optical repeater $4_{k-1}$ is calculated in accordance with the equation (4), then, the correction ratio $c_k$ corresponding to the ASE light is calculated making use of the relationship of the following equation (5):

$$c_k = 10^{\frac{NF_k - PTin(k) + 10 \cdot \log(wave) + E_{k-1}' - x}{10}} \qquad (5)$$

wherein x is a constant depending on the wavelength band.

When the correction ratio $c_k$ is calculated, the correction ratio $d_k$ for the whole of the own optical repeater is calculated, by using the relationship of the following equation (6):

$$d_k = d_{k-1} + b_k + c_k \qquad (6).$$

The correction ratio $d_k$ calculated in accordance with the equation (6) is transferred to the OSC monitoring section 41, and then, loaded on the optical supervisory channel light together with information concerning the number of channel wavelengths of the WDM signal light and the like, to be transmitted, as the correction ratio $d_k$ in the optical repeater $4_k$ at the k-th stage, to the succeeding stage optical repeater. Further, in the calculation controlling section 31 at the EDFA side, an output correction amount $E_k'$ of the EDFA is calculated making use of the calculated correction ratio $d_k$. This output correction amount $E_k'$ is a correction amount corresponding to the reduction amount of the signal light component due to the generation of the ASS light and ASE light, and can be calculated by using the relationship represented by the following equation (7):

$$E'_k = 10 \cdot \log\left(1 + \frac{d_k \cdot 10 \cdot BW}{wave}\right). \quad (7)$$

Based on the output correction amount $E_k'$ calculated in accordance with the equation (7), the operating state of the EDFA 20 is controlled by the calculation controlling section 31. Concretely, at the calculation controlling section 31, the output setting level of the ALC circuit 27a (FIG. 2) is adjusted so as to correspond to the output correction amount $E_k'$. In this way, the optical attenuation amount of the variable optical attenuator 27 is controlled so that the total output light power of the EDFA 20 is kept constant at a level where the influence due to the generation of the ASS light and ASE light is corrected. Note, when it is required to conduct a level adjustment for exceeding the variable range of the variable optical attenuator 27, the driving condition of the excitation light source 22A or 22B may be controlled by adjusting a set gain of the AGC circuit 26A of the preceding stage optical amplifying section or the AGC circuit 26B of the succeeding stage optical amplifying section.

Figure 4:
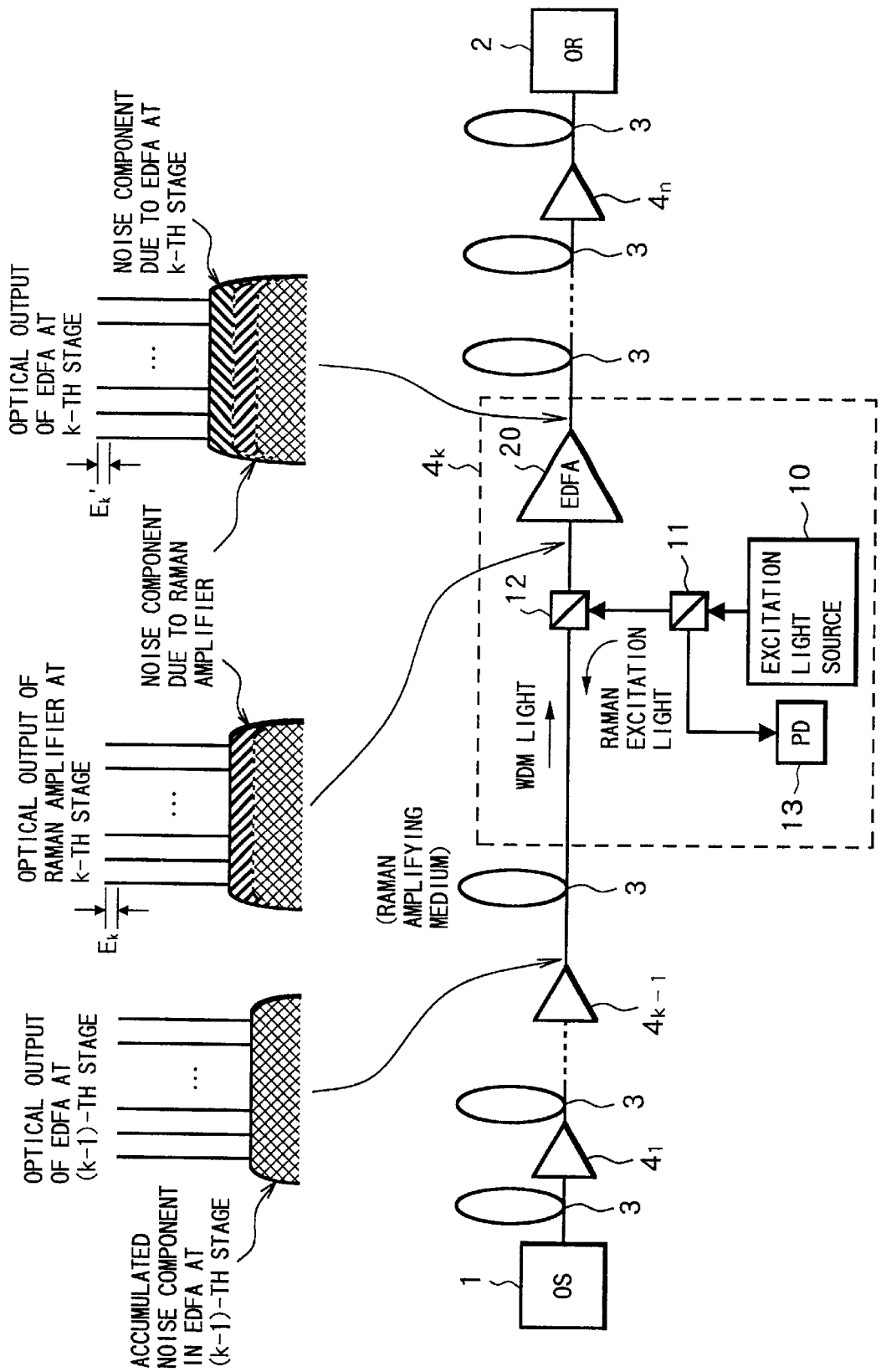
FIG. 4 is a diagram explaining a concept of output correction in the first embodiment of the present invention.

FIG. 4 is a diagram explaining a concept of the output correction in the present WDM optical communication system, taking notice of the optical repeater $4_k$.

As shown in FIG. 4, the WDM signal light having a state represented at the left side of the upper half of this figure is output from the preceding stage optical repeater $4_{k-1}$ to the transmission path 3. Then, the WDM signal light propagated through the transmission path 3 is distribution-Raman amplified and sent to the optical repeater $4_k$. At this time, the WDM signal light to be input into the EDFA 20 of the optical repeater $4_k$ is accumulated with the noise component (ASS light) due to the Raman amplification, as represented at the center of the upper half of this figure. Further, the WDM signal light amplified by the EDFA 20 is accumulated with the noise component (ASE light) due to the EDFA 20, as represented at the right side of the upper half of this figure. In this embodiment, for the generation of ASS light and ASE light, the output setting levels of the Raman amplifier and EDFA 20 are adjusted, respectively, in accordance with the calculated output correction amount $E_k$ and output correction amount $E_k'$. In this way, an automatic control for keeping the optical SN ratio concerning the WDM signal light to be output from the optical repeater $4_k$ substantially constant can be performed, irrespective of the number of channel wavelengths of the signal light and a noise amount caused in the Raman amplifier, even when the ASS light and ASE light are generated.

According to the WDM optical communication system of the first embodiment, in the optical amplifying apparatus constituted by combining the Raman amplifier with the EDFA in each of the optical repeaters $4_1$ to $4_n$, the ASS light power is calculated based on the Raman excitation light power and an output correction reflecting the information of the ASS light power is performed so that the SN ratio concerning the WDM signal light to be output from each of the optical repeaters $4_1$ to $4_n$ is controlled to be substantially constant irrespective of the number of channel wavelength of the signal light and the noise amount caused in the Raman amplifier. Thus, it becomes possible to prevent deterioration of the optical SN ratio at the optical receiver 2. As a result, it becomes possible to improve the transmission characteristic in the WDM optical communication system, and to obtain excellent receiving sensitivity at the optical receiver 2.

In the aforementioned first embodiment, the output correction amounts of both of the Raman amplifier and the EDFA have been calculated, to adjust the output setting levels thereof. However, the present invention is not limited thereto. It is also possible to adjust either the output setting level of the Raman amplifier side or that of the EDFA side, corresponding to the calculated correction ratio $d_k$.

Figure 5:
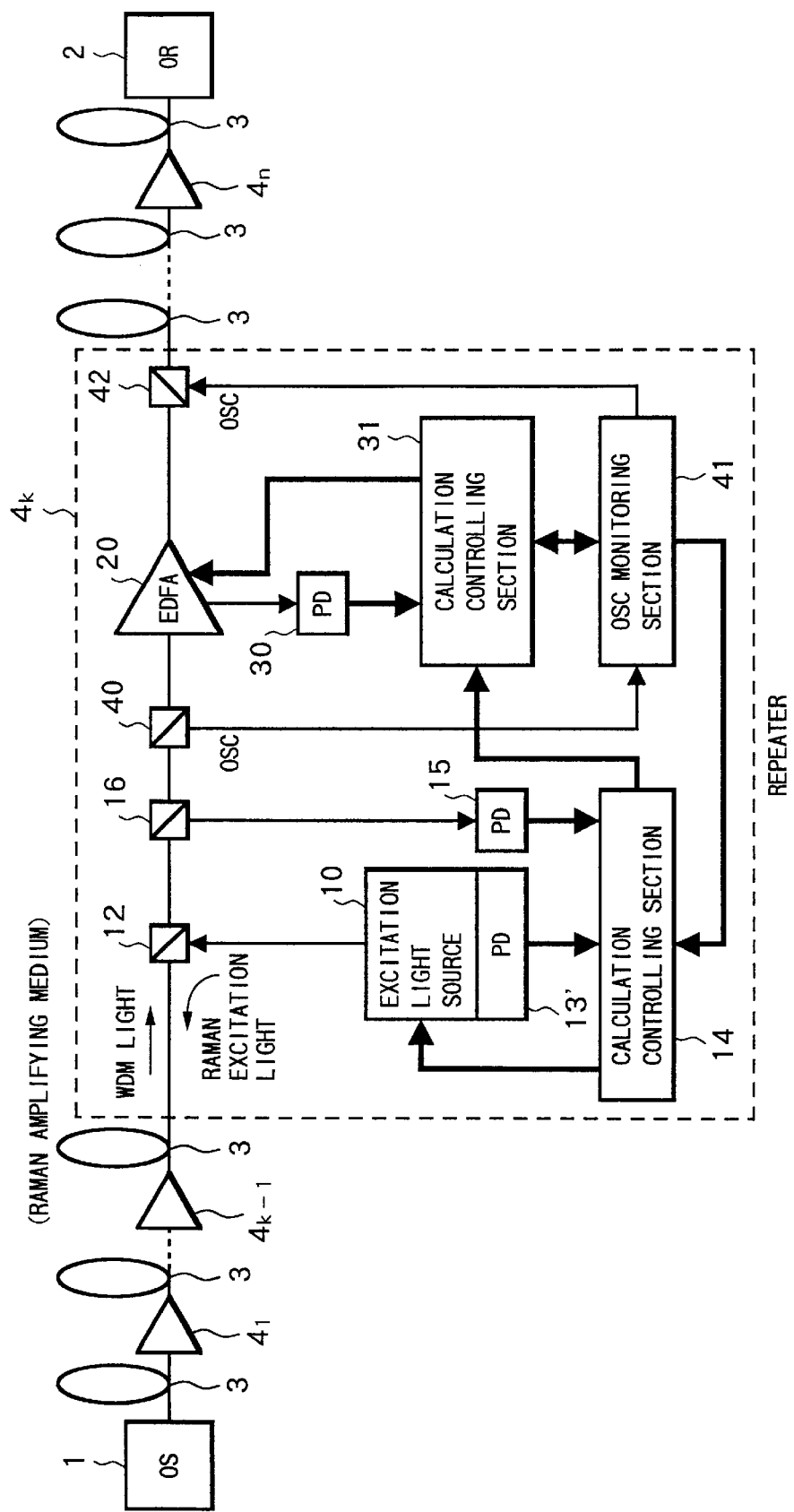
FIG. 5 is a block diagram showing another constitutional example of the first embodiment of the present invention, adopting a modified method for monitoring the excitation light for Raman amplification.

Further, a part of the Raman excitation light to be output from the forward side of the excitation light source 10 is branched by the optical coupler 11 and the branched light is received by the PD, in each of the optical repeaters $4_1$ to $4_n$. However, in addition to the above, as shown in FIG. 5, in a case where an LD is used as the excitation light source 10, it is also possible to monitor the Raman excitation light making use of a PD 13' incorporated in the excitation light source 10, to transfer the monitoring result to the calculation controlling section 14. Namely, it is possible to measure the power of the excitation light to be output from the forward side of the LD, by detecting the power of the light to be output from the rearward side of the LD at the PD 13'. Since the Raman excitation light is monitored by such a constitution, it becomes unnecessary to provide the optical coupler 11, thereby enabling to supply Raman excitation light having a higher power to the transmission path.

Figure 6:
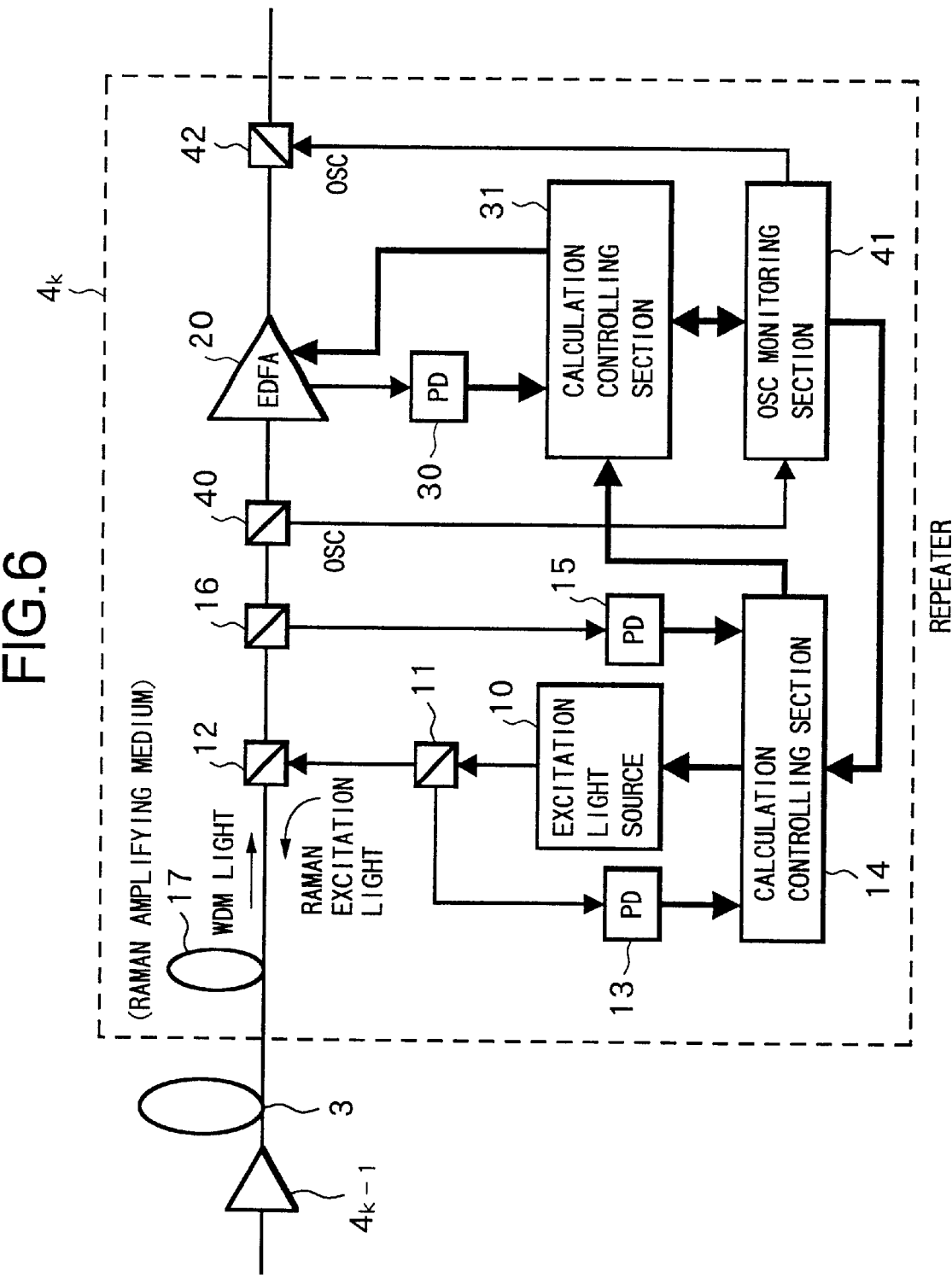
FIG. 6 is a block diagram showing yet another constitutional example of the first embodiment of the present invention, adopting a Raman amplifying medium within an optical repeater.

Moreover, the transmission path 3 connecting between respective optical repeaters has been constituted to be a Raman amplifying medium. However, the present invention is not limited thereto. For example, as shown in FIG. 6, it is also possible to insert a Raman amplifying medium 17 between the signal light input end of the optical repeater $4_k$ and the optical coupler 12 for multiplexing the Raman excitation light. As the Raman amplifying medium 17 to be inserted, it is preferable to adopt an optical fiber having a higher excitation efficiency and a smaller mode field diameter.

There will be now explained a second embodiment of the present invention.

Figure 7:
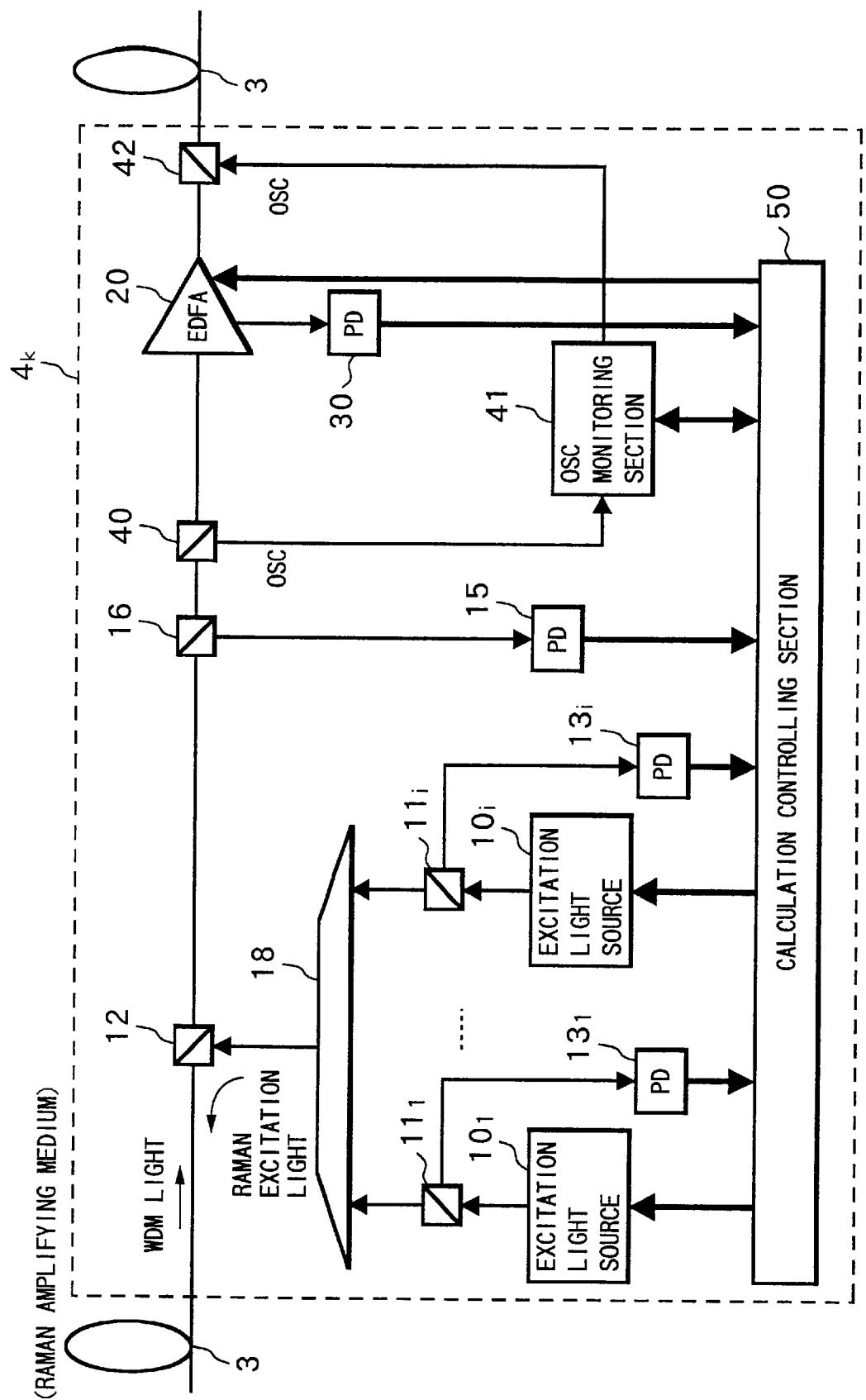
FIG. 7 is a block diagram showing an essential constitution of an optical communication system according to a second embodiment of the present invention.

FIG. 7 is a block diagram showing an essential constitution of a WDM optical communication system according to the second embodiment of the present invention. Same reference numerals as used in the first embodiment are used to denote corresponding or identical elements in this embodiment, and the same rule applies corresponding to the following.

This WDM optical communication system of FIG. 7 has a constitution different from that of the first embodiment of FIG. 1, in that: a plurality of excitation light sources $10_1$, to $10_i$ (i pieces, in this figure) having different wavelengths are provided in each of optical repeaters $4_1$ to $4_n$; the Raman excitation light to be generated by the excitation light sources $10_1$ to $10_i$ are multiplexed at a WDM coupler 18 and then supplied to the transmission path 3 via the optical coupler 12; a part of the Raman excitation light generated by each of the excitation light sources $10_1$ to $10_i$ is branched at each of the optical couplers $11_1$ to $11_i$, and monitored by each of photodetectors (PD's) $13_1$ to $13_i$; and the respective monitoring results are sent to a calculation controlling section 50. This calculation controlling section 50 is provided by uniting the functions of the calculation controlling section 14 at the Raman amplifier side and the calculation controlling section 31 at the EDFA side as used in the first embodiment, to execute the same calculation procedures as in the first embodiment. The driving conditions of the excitation light sources $10_1$ to $10_i$ and of the EDFA 20 are controlled in accordance with the calculation results.

The constitution and operation thereof in the second embodiment other than the above are the same as the first embodiment, so that the explanation thereof shall be omitted.

According to the second embodiment, even in the case where the plurality of excitation light sources $10_1$ to $10_i$ having different wavelengths are combined to generate the Raman excitation light, it is also possible to obtain the same effect as the first embodiment since the noise components due to the Raman amplification can be calculated making use of the aforementioned equation (1) by monitoring the Raman excitation light powers at respective wavelengths.

In the second embodiment, the calculation controlling sections at the Raman amplifier side and the EDFA side have been united. However, it is also possible to provide calculation controlling sections separately for the Raman amplifier side and the EDFA side, similarly to the first embodiment.

Further, in the second embodiment, the part of Raman excitation light to be output from the forward side of each of the excitation light sources $10_1$ to $10_i$ has been branched by each of the optical couplers $11_1$ to $11_i$, to be received by each of the photodetectors $13_1$ to $13_i$. However, it is also possible to monitor the light output from the rearward side of each of the excitation light sources, similarly to the situation shown in FIG. 5. Alternatively, it is possible to branch a part of the Raman excitation light multiplexed by the WDM coupler 18, and to demultiplex the branched light into the respective wavelength components by making use of optical filters having narrow bands, to thereby monitor the light power of each of the wavelength components.

There will be described hereinafter a third embodiment of the present invention. In this third embodiment, there will be considered a WDM optical communication system for collectively transmitting so-called C-band WDM signal light having a 1.550 nm wavelength band and so-called L-band WDM signal light having a 1.580 nm wavelength band, for example.

Figure 8:
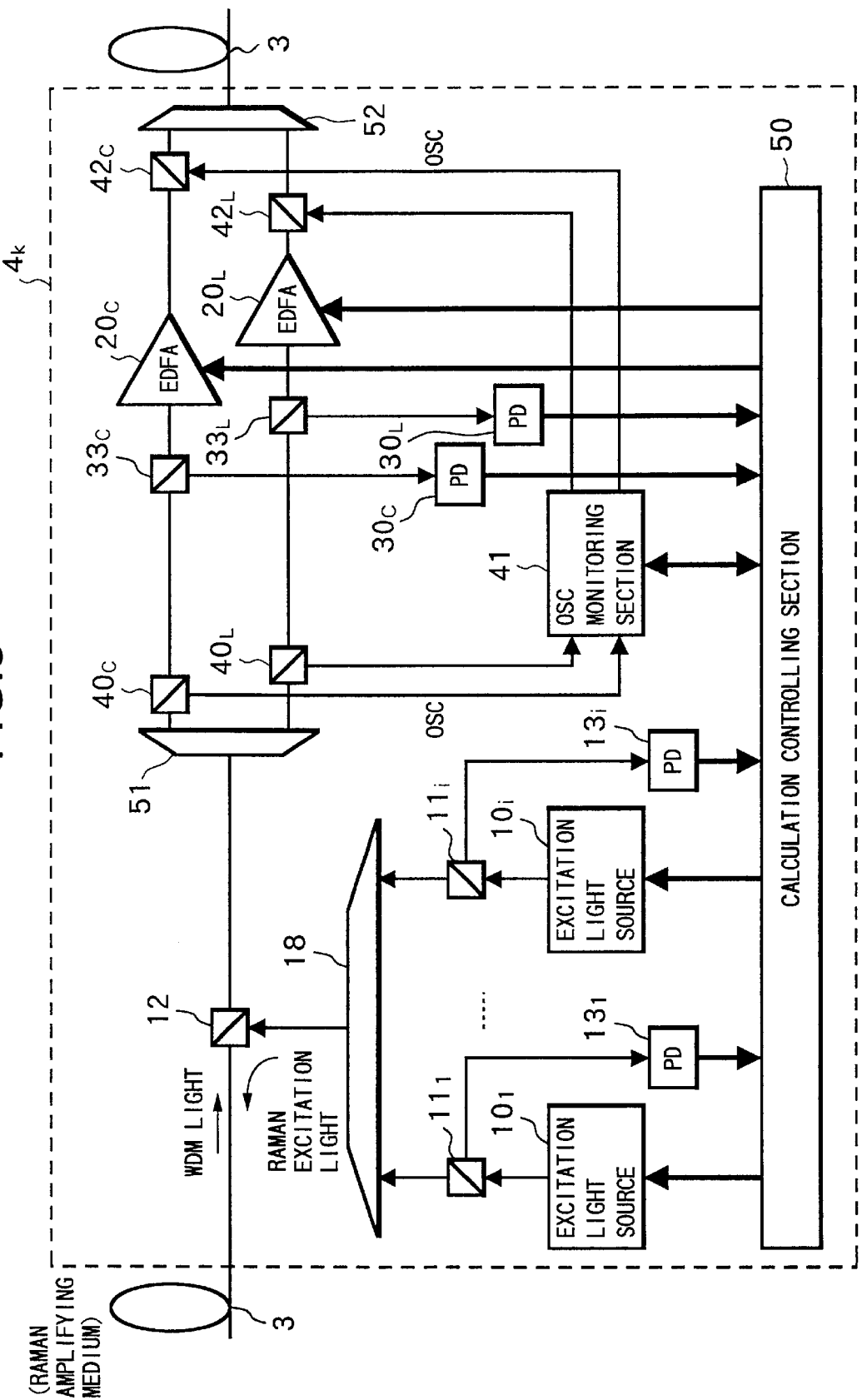
FIG. 8 is a block diagram showing an essential constitution of an optical repeater to be adopted in an optical communication system according to a third embodiment of the present invention.
Figure 9:
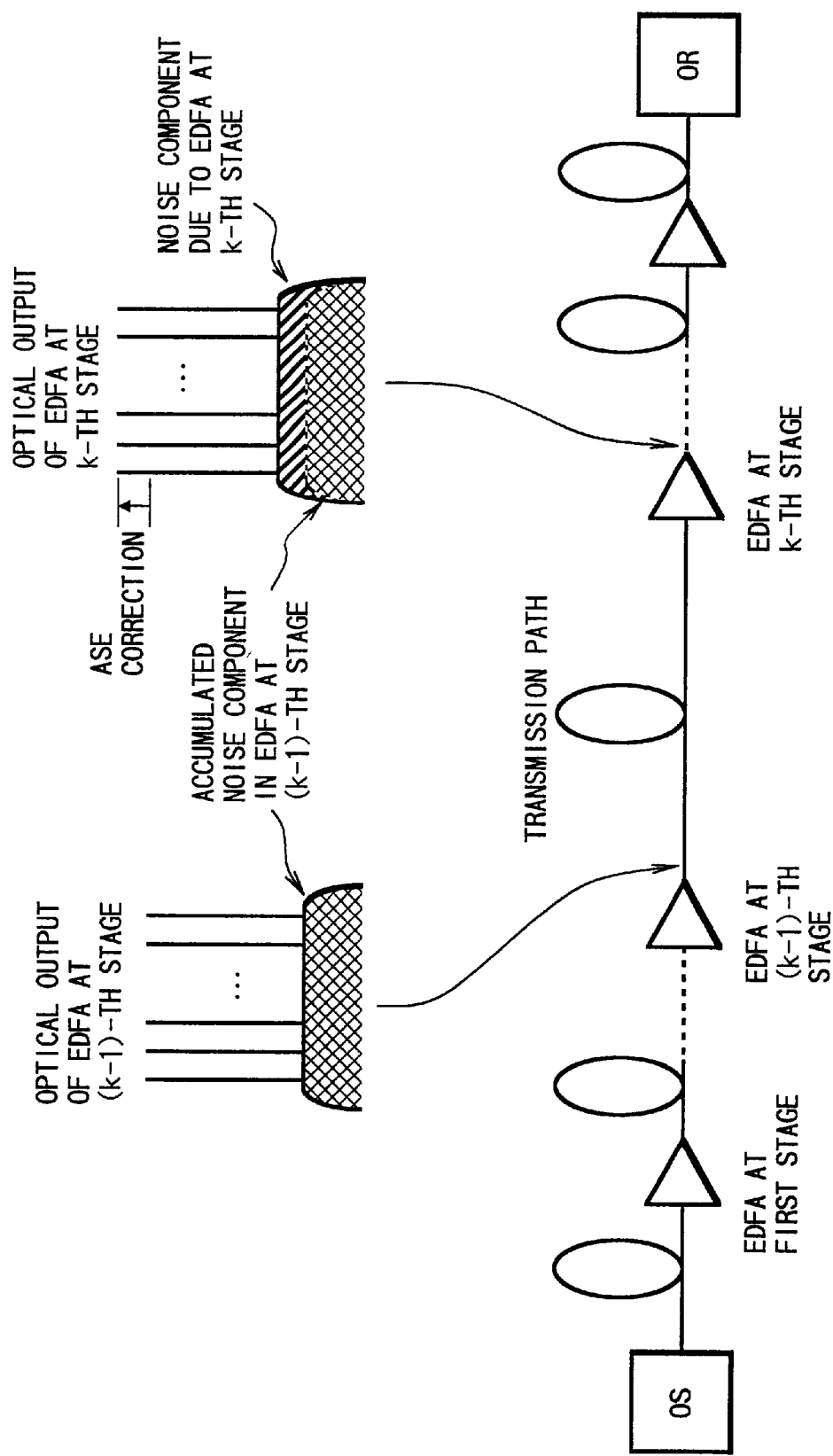
FIG. 9 is a diagram explaining a concept of ASE correction in a conventional optical communication system.

FIG. 8 is a block diagram showing an essential constitution of an optical repeater to be used in the WDM optical communication system according to the third embodiment. Although this figure shows only a specific constitution of an optical repeater $4_k$ at the k-th stage, other optical repeaters have the same constitution.

In FIG. 8, the optical repeater $4_k$ is provided to have a constitution to match with the C-band and L-band, respectively, by modifying the constitution of the EDFA side in the optical repeater $4_k$ adopted in the second embodiment shown in FIG. 7. Concretely, the WDM signal light input into the optical repeater $4_k$ and passed through the optical coupler 12 is demultiplexed by a WDM coupler 51 into the C-band WDM signal light and the L-band WDM signal light. The C-band WDM signal light is sent via optical couplers $40_C$, $33_C$ to a C-band aimed EDFA $20_C$ to be amplified thereby, while the L-band WDM signal light is sent via optical couplers $40_L$, $33_L$ to an L-band aimed EDFA $20_L$ to be amplified thereby. The output light of the C-band aimed EDFA $20_C$ and the output light of the L-band aimed EDFA $20_L$ are sent via optical coupler $42_C$ and optical coupler $42_L$, respectively, to a WDM coupler 52, to be multiplexed thereby, and then output to the transmission path 3. Each of the C-band aimed EDFA $20_C$ and L-band aimed EDFA $20_L$ may have a specific constitution such as shown in FIG. 2.

Further, a part of the input light into the C-band aimed EDFA $20_C$ is branched by the optical coupler $33_C$. The power of this branched light is monitored by a photodetector (PD) $30_C$, and the monitoring result is transferred to a calculation controlling section 50. Similarly, a part of the input light into the L-band aimed EDFA $20_L$ is branched by the optical coupler $33_L$. The power of this branched light is monitored by a photodetector (PD) $30_L$, and the monitoring result is transferred to the calculation controlling section 50. It is assumed here that the PD 15 and the optical coupler 16 used in the second embodiment are substituted by the PD's $30_C$, $30_L$ and optical couplers $33_C$, $33_L$, respectively.

It is further assumed in this embodiment that the optical supervisory channel light corresponding to the C-band and the optical supervisory channel light corresponding to the L-band are multiplexed into the WDM signal light, to be transmitted between respective optical repeaters. To receive and process the optical supervisory channel light corresponding to the C-band sent from the preceding stage optical repeater $4_{k-1}$, the optical repeater $4_k$ is provided with the optical coupler $40_C$, for example, between a C-band output end of the WDM coupler 51 and the optical coupler $33_C$, so that the optical supervisory channel light of the C-band extracted by the optical coupler $40_C$ is sent to the OSC monitoring section 41. Similarly, the optical coupler $40_L$ is provided, for example, between an L-band output end of the WDM coupler 51 and the optical coupler $33_L$ so that the optical supervisory channel light of the L-band extracted by the optical coupler $40_L$ is sent to the OSC monitoring section 41. In this OSC monitoring section 41, information concerning the correction ratio at the preceding stage optical repeater, the number of channel wavelengths of the WDM signal light and the like, included in the optical supervisory channel light, is identified for the respective C-band and L-band, to be transferred to the calculation controlling section 50. Further, the OSC monitoring section 41 generates the optical supervisory channel light including information concerning the correction ratios corresponding to the respective bands at the own optical repeater, which have been calculated at the calculation controlling section 50, the number of channel wavelengths of the WDM signal light and the like. Then, the optical supervisory channel light of the C-band is multiplexed into the C-band WDM signal light via an optical coupler $42_C$ inserted after the C-band aimed EDFA $20_C$, and the optical supervisory channel light of the L-band is multiplexed into the L-band WDM signal light via an optical coupler $42_L$ inserted after the L-band aimed EDFA $20_L$. It is assumed here that the optical wavelength of each optical supervisory channel light is arranged outside its corresponding band.

In the optical repeater $4_k$ having the aforementioned constitution, the calculation controlling section 50 calculates correction ratios and output correction amounts corresponding to the C-band and L-band, respectively. Concretely, the calculation controlling section 50 calculates ASS light total power $Ass_C$ and ASS light total power $ASS_L$ for the respective bands in accordance with the following equation ($1_C$) and equation ($1_L$), making use of Raman excitation light power of each of the respective wavelengths. Each of the equation ($1_C$) and equation ($1_L$) is an exemplary expression of relations concerning the aforementioned equation (1), such as by taking account of the influence of the inter-pumping Raman in case of adopting three excitation light sources having different wavelengths (i=3), and by approximating the relationship (FIG. 3) between the total power of the ASS light and the power of the Raman excitation light, by quadratic functions, to thereby further improve the precision:

$$Ass_C = cm_1 \cdot 10^{\frac{cd_2 \cdot (cp_1 \cdot Pu_1)^2 + cd_1 \cdot (cp_1 \cdot Pu_1 - d_{12} \cdot cp_1^2 \cdot Pu_1^2 \cdot cp_2 \cdot Pu_2 - d_{31} \cdot cp_3 \cdot Pu_3 \cdot cp_1^2 \cdot Pu_1^2) + cd_0}{10}} + \quad (1_C)$$

$$cm_2 \cdot 10^{\frac{cd_2 \cdot (cp_2 \cdot Pu_2)^2 + cd_1 \cdot (cp_2 \cdot Pu_2 - d_{23} \cdot cp_2^2 \cdot Pu_2^2 \cdot cp_3 \cdot Pu_3 + d_{12} \cdot cp_1 \cdot Pu_1 \cdot cp_2^2 \cdot Pu_2^2) + cd_0}{10}} +$$

$$cm_3 \cdot 10^{\frac{cd_2 \cdot (cp_3 \cdot Pu_3)^2 + cd_1 \cdot (cp_3 \cdot Pu_3 + d_{31} \cdot cp_3^2 \cdot Pu_3^2 \cdot cp_1 \cdot Pu_1 + d_{23} \cdot cp_2 \cdot Pu_2 \cdot cp_3^2 \cdot Pu_3^2) + cd_0}{10}}; \text{ and}$$

$$Ass_L = lm_1 \cdot 10^{\frac{ld_2 \cdot (lp_1 \cdot Pu_1)^2 + ld_1 \cdot (lp_1 \cdot Pu_1 - d_{12} \cdot lp_1^2 \cdot Pu_1^2 \cdot lp_2 \cdot Pu_2 - d_{31} \cdot lp_3 \cdot Pu_3 \cdot lp_1^2 \cdot Pu_1^2) + ld_0}{10}} + \quad (1_L)$$

$$lm_2 \cdot 10^{\frac{ld_2 \cdot (lp_2 \cdot Pu_2)^2 + ld_1 \cdot (lp_2 \cdot Pu_2 - d_{23} \cdot lp_2^2 \cdot Pu_2^2 \cdot lp_3 \cdot Pu_3 + d_{12} \cdot lp_1 \cdot Pu_1 \cdot lp_2^2 \cdot Pu_2^2) + ld_0}{10}} +$$

$$lm_3 \cdot 10^{\frac{ld_2 \cdot (lp_3 \cdot Pu_3)^2 + ld_1 \cdot (lp_3 \cdot Pu_3 + d_{31} \cdot lp_3^2 \cdot Pu_3^2 \cdot lp_1 \cdot Pu_1 + d_{23} \cdot lp_2 \cdot Pu_2 \cdot lp_3^2 \cdot Pu_3^2) + ld_0}{10}}$$

wherein $Pu_1$ to $Pu_3$ each represents Raman excitation light power generated at each of the excitation light sources, $cm_1$ to $cm_3$ and $lm_1$ to $lm_3$ each represents a weighting coefficient, $cd_0$ to $cd_2$ and $ld_0$ to $ld_2$ each represents calculation equation coefficients, $cp_0$ to $cp_3$ and $lp_0$ to $lp_3$ each represent an effective pumping coefficient, and $d_{12}$, $d_{23}$, $d_{31}$ each represents an inter-pumping Raman coefficient.

When the ASS light total power $Ass_C$ and the ASS light total power $ASS_L$ for each band are calculated in accordance with the equation ($1_C$) and equation ($1_L$), respectively, then correction ratios $b_{k(C)}$, $b_{k(L)}$ corresponding to the noise components due to Raman amplification in each band are calculated making use of the aforementioned equation (2) (while substituting the term "Ass" in the equation (2) by "$Ass_C$" or "$Ass_L$"), respectively. Further, output correction amounts $E_{k(C)}$, $E_{k(L)}$ of the Raman amplifiers in each band are calculated making use of the equation (3). Then, the driving conditions of the respective excitation light sources are adjusted in accordance with the calculated output correction amounts $E_{k(C)}$, $E_{k(L)}$, so that the total power of the Raman amplified WDM signal light is controlled to be constant at a level where the influence due to the ASS light is corrected.

Further, the calculation controlling section 50 calculates correction ratios $c_{k(C)}$, $c_{k(L)}$ corresponding to the noise components of the EDFA's at respective bands making use of the aforementioned equations (4), (5), and calculates correction ratios $d_{k(C)}$, $d_{k(L)}$ at respective bands for the whole of the own optical repeater making use of the aforementioned equation (6). Further, output correction amounts $E_{k(C)}'$, $E_{k(L)}'$ of the EDFA's for the respective bands are calculated making use of the equation (7). Then, the driving conditions of the C-band aimed EDFA 20$_C$ and L-band aimed EDFA 20$_L$ are controlled in accordance with the calculated output correction amounts $E_{k(C)}'$, $E_{k(L)}'$, respectively.

According to the third embodiment as described above, the output corrections corresponding to the respective bands are conducted in a WDM optical communication system in which each of the WDM signal light of the C-band and L-band is collectively transmitted, so that the SN ratios concerning the C-band and the L-band WDM signal light to be output from each of the optical repeaters 4$_1$ to 4$_n$ can be controlled to be constant irrespective of the number of channel wavelengths of the signal light and the noise amount caused in the Raman amplifier. Thus, it becomes possible to prevent deterioration of an optical SN ratio at the optical receiver 2. In this way, it becomes possible to improve the transmission characteristics of the C-band and L-band in the WDM optical communication system, to thereby obtain excellent receiving sensitivity at the optical receiver 2.

In the third embodiment, the calculation controlling sections have been united into one unit. However, it is possible to provide individual calculation controlling sections for the Raman amplifier side and the EDFA side. It is also possible to provide individual calculation controlling sections for the C-band aimed EDFA and the L-band aimed EDFA. Meanwhile, concerning the monitoring method for the Raman excitation light, it is possible to monitor the light exiting from the rearward side of the excitation light source, or to demultiplex a part of the multiplexed Raman excitation light again to the respective wavelength components such as by optical filters having narrow bands to thereby monitor the light power of each of the wavelength components.

In the first through third embodiments, there has been exemplified a two-stage amplifying constitution having the preceding stage amplifying section and the succeeding stage amplifying section, as a specific constitution of EDFA. However, the constitution of EDFA to be adopted in the present invention is not limited thereto, and it is possible to adopt an amplifying constitution of a single stage, or three or more stages.

Industrial Applicability

The present invention has a great industrial applicability for various optical amplifying apparatus to be used in optical communications and for various optical communication systems, and is particularly useful for optical amplifying apparatus for amplifying WDM signal light by combining Raman amplifiers, and for WDM optical communication systems adopting such optical amplifying apparatus.

What is claimed is:

1. An optical amplifying apparatus comprising: first optical amplifying means for supplying excitation light to a Raman amplifying medium to thereby Raman amplify the signal light propagated through said Raman amplifying medium; and second optical amplifying means for amplifying signal light output from said first optical amplifying means, wherein said optical amplifying apparatus further comprises controlling means for controlling an operating state of at least one of said first optical amplifying means and said second optical amplifying means, so that a signal/noise ratio of the signal light to be output from said second optical amplifying means is kept substantially constant.

2. An optical amplifying apparatus comprising: first optical amplifying means for supplying excitation light to a Raman amplifying medium to thereby Raman amplify signal light propagated through said Raman amplifying medium; and second optical amplifying means for amplifying the signal light output from said first optical amplifying means, in which output light of at least one of said first optical amplifying means and said second optical amplifying means is controlled to be a previously determined output setting level, wherein said optical amplifying apparatus further comprises:
  detecting means for detecting excitation light power to be supplied to said Raman amplifying medium;
  calculating means for calculating a noise light component due to said first optical amplifying means, based on a detection result by said detecting means; and
  output setting level correcting means for correcting said output setting level based on a calculation result by said calculating means, to keep signal light power per single channel wavelength included in said output light to be constant, irrespective of the number of channel wavelengths of the signal light.

3. An optical amplifying apparatus comprising: first optical amplifying means for supplying excitation light to a Raman amplifying medium to thereby Raman amplify signal light propagated through said Raman amplifying medium; and second optical amplifying means for amplifying signal light output from said first optical amplifying means,
  wherein the optical amplifying apparatus further comprises:
    detecting means for detecting excitation light power to be supplied to said Raman amplifying medium;
    calculating means for calculating a noise light component due to said first optical amplifying means, based on a detection result by said detecting means; and
    transfer means for transferring a calculation result by said calculating means to said second optical amplifying means.

4. An optical amplifying apparatus according to claim 1, wherein the signal/noise ratio of the signal light to be output from said second optical amplifying means is controlled to be substantially constant, irrespective of a noise amount caused in said first optical amplifying means.

5. An optical amplifying apparatus according to claim 1, wherein the signal/noise ratio of the signal light to be output from said second optical amplifying means is controlled to be substantially constant, irrespective of the number of channel wavelengths of the signal light.

6. An optical amplifying apparatus according to claim 1, wherein said controlling means comprises:
  an excitation light power detecting section for detecting the excitation light power to be supplied to said Raman amplifying medium;
  an input light power detecting section for detecting input light power into said second optical amplifying means;
  control information receiving section for receiving information concerning a signal/noise ratio at a preceding stage optical amplifying apparatus; and
  a calculation controlling section for obtaining the signal/noise ratio of the signal light to be output from said second optical amplifying means, based on the noise light component due to said first optical amplifying means calculated corresponding to the detection result by said excitation light power detecting section and to the information received by said control information receiving section, and based on a noise light component due to said second optical amplifying means calculated corresponding to the detection result by said input light power detecting section and to the information received by said control information receiving section, and for controlling the operating state of at least one of said first optical amplifying means and said second optical amplifying means, corresponding to the thus obtained signal/noise ratio.

7. An optical amplifying apparatus according to claim 6, wherein the information received by said control information receiving section includes a signal/noise ratio and the number of multiplexed channel wavelengths for signal light output from said preceding stage optical amplifying apparatus.

8. An optical amplifying apparatus according to claim 7, further comprising:
  a control information transmitting section for transmitting, to a succeeding stage optical amplifying apparatus, information including the signal/noise ratio obtained by said calculation controlling section and the number of multiplexed channel wavelengths, concerning the signal light to be output from said second optical amplifying means.

9. An optical amplifying apparatus according to claim 6, wherein said excitation light power detecting section detects the excitation light power, based on light to be output from the forward side of an excitation light source.

10. An optical amplifying apparatus according to claim 6, wherein said excitation light power detecting section detects the excitation light power, based on light to be output from the rearward side of an excitation light source.

11. An optical amplifying apparatus according to claim 1, wherein, when said second optical amplifying means includes a constant-output controlling section for controlling total power of the output light to be constant, said controlling means controls the output setting level of said constant-output controlling section.

12. An optical amplifying apparatus according to claim 1, wherein said controlling means controls setting of an amplification gain in said second optical amplifying means.

13. An optical amplifying apparatus according to claim 1, wherein, when said first optical amplifying means includes a constant-output controlling section for controlling total power of the output light to be constant, said controlling means controls the output setting level of said constant-output controlling section.

14. An optical amplifying apparatus according to claim 1, wherein second optical amplifying means comprises an optical fiber amplifier adopting a rare earth element doped optical fiber.

15. An optical amplifying apparatus according to claim 14, wherein said second optical amplifying means is configured by connecting in series a plurality of optical amplifying sections having substantially the same amplifying wavelength band.

16. An optical amplifying apparatus according to claim 14, wherein said second optical amplifying means is configured by connecting in parallel a plurality of optical amplifying sections having different amplifying wavelength bands.

17. An optical communication system wherein a plurality of optical repeaters, each having the optical amplifying apparatus according to claim 1, are arranged in a transmission path connecting an optical sender and an optical receiver.

18. An optical communication system comprising a plurality of optical repeaters, each having: first optical amplifying means for supplying excitation light to a Raman amplifying medium to thereby Raman amplify the signal light propagated through said Raman amplifying medium; and second optical amplifying means for amplifying signal light output from said first optical amplifying means, wherein information concerning a signal/noise ratio in a preceding stage optical repeater is transmitted to a succeeding stage optical repeater, and, in each optical repeater, an operating state of at least one of said first optical amplifying means and said second optical amplifying means is controlled, so that a signal/noise ratio of an output signal light is kept substantially constant.

19. An optical communication system according to claim 18, wherein the signal/noise ratio of the signal light to be output from said second optical amplifying means is controlled to be substantially constant, irrespective of a noise amount caused in said first optical amplifying means.

20. An optical communication system according to claim 18, wherein the signal/noise ratio of the signal light to be output from said second optical amplifying means is controlled to be substantially constant, irrespective of the number of channel wavelengths of the signal light.

21. An optical amplifying apparatus comprising:

a first optical amplifying unit to supply excitation light to a Raman amplifying medium to thereby Raman amplify the signal light propagated through said Raman amplifying medium;

a second optical amplifying unit to amplify signal light output from said first optical amplifying unit; and a control unit to control an operating state of at least one of said first optical amplifying unit and said second optical amplifying unit so that a signal/noise ratio of the signal light to be output from said second optical amplifying unit is kept substantially constant.

22. An optical amplifying apparatus comprising:

a first optical amplifying unit to supply excitation light to a Raman amplifying medium to thereby Raman amplify signal light propagated through said Raman amplifying medium;

a second optical amplifying unit to amplify the signal light output from said first optical amplifying unit, in which output light of at least one of said first optical amplifying unit and said second optical amplifying unit is controlled to be a previously determined output setting level;

a detector to detect excitation light power to be supplied to Raman amplifying medium;

a calculating unit to calculate a noise light component due to said first optical amplifying unit based on a detection result by said detecting unit; and an output setting level correcting unit to correct said output setting level based on a calculation result by said calculating unit to keep signal light power per single channel wavelength included in said output light to be constant, irrespective of the number of channel wavelengths of the signal light.

23. An optical amplifying apparatus comprising:

a first optical amplifying unit to supply excitation light to a Raman amplifying medium to thereby Raman amplify signal light propagated through said Raman amplifying medium;

a second optical amplifying unit to amplify the signal light output from said first optical amplifying unit;

a detector to detect excitation light power to be supplied to said Raman amplifying medium;

a calculating unit to calculate a noise light component due to said first optical amplifying unit based on a detection result by said detecting unit; and a transfer unit to transfer a calculation result by said calculating unit to said second optical amplifying unit.

24. An optical amplifying apparatus according to claim 21, wherein the signal/noise ratio of the signal light to be output from said second optical amplifying unit is controlled to be substantially constant irrespective of a noise amount caused in said first optical amplifying unit.

25. An optical amplifying apparatus according to claim 21, wherein the signal/noise ratio of the signal light to be output from said second optical amplifying unit is controlled to be substantially constant irrespective of the number of channel wavelengths of the signal light.

26. An optical amplifying apparatus according to claim 21, wherein said control unit comprises:

an excitation light power detecting section to detect the excitation light power to be supplied to said Raman amplifying medium;

an input light power detecting section to detect input light power into said second optical amplifying unit;

a control information receiving section to receive information concerning a signal/noise ratio at a preceding stage optical amplifying apparatus; and a calculation controlling section to obtain the signal/noise ratio of the signal light to be output from said second optical amplifying unit based on the noise light component due to said first optical amplifying unit calculated corresponding to the detection result by said excitation light power detecting section and to the information received by said control information receiving section, and based on a noise light component due to said second optical amplifying unit calculated corresponding to the detection result by said input light power detecting section and to the information received by said control information receiving section, and to control the operating state of at least one of said first optical amplifying unit and said second optical amplifying unit, corresponding to the thus obtained signal/noise ratio.

27. An optical amplifying apparatus according to claim 26, wherein the information received by said control information receiving section includes a signal/noise ratio and the number of multiplexed channel wavelengths for signal light output from said preceding stage optical amplifying apparatus.

28. An optical amplifying apparatus according to claim 27, further comprising:

a control information transmitting section to transmit, to a succeeding stage optical amplifying apparatus, information including the signal/noise ratio obtained by said calculation controlling section and the number of multiplexed channel wavelengths, concerning the signal light to be output from said second optical amplifying unit.

29. An optical amplifying apparatus according to claim 26, wherein said excitation light power detecting section detects the excitation light power based on light to be output from the forward side of an excitation light source.

30. An optical amplifying apparatus according to claim 26,
wherein said excitation light power detecting section detects the excitation light power based on light to be output from the rearward side of an excitation light source.

31. An optical amplifying apparatus according to claim 21,
wherein, when said second optical amplifying unit includes a constant-output controlling section to control total power of the output light to be constant, said controlling unit controls the output setting level of said constant-output controlling section.

32. An optical amplifying apparatus according to claim 21,
wherein said controlling unit controls setting of an amplification gain in said second optical amplifying unit.

33. An optical amplifying apparatus according to claim 21,
wherein, when said first optical amplifying unit includes a constant-output controlling section to control total power of the output light to be constant, said controlling unit controls the output setting level of said constant-output controlling section.

34. An optical amplifying apparatus according to claim 21,
wherein second optical amplifying unit comprises an optical fiber amplifier adopting a rare earth element doped optical fiber.

35. An optical amplifying apparatus according to claim 34,
wherein said second optical amplifying unit is configured by connecting in series a plurality of optical amplifying sections having substantially the same amplifying wavelength band.

36. An optical amplifying apparatus according to claim 34,
wherein said second optical amplifying unit is configured by connecting in parallel a plurality of optical amplifying sections having different amplifying wavelength bands.

37. An optical communication system wherein a plurality of optical repeaters, each having the optical amplifying apparatus according to claim 21, are arranged in a transmission path connecting an optical sender and an optical receiver.

38. An optical communication system comprising a plurality of optical repeaters, each having:
a first optical amplifying unit to supply excitation light to a Raman amplifying medium to thereby Raman amplify the signal light propagated through said Raman amplifying medium; and
a second optical amplifying unit to amplify signal light output from said first optical amplifying unit,
wherein information concerning a signal/noise ratio in a preceding stage optical repeater is transmitted to a succeeding stage optical repeater, and, in each optical repeater, an operating state of at least one of said first optical amplifying unit and said second optical amplifying unit is controlled, so that a signal/noise ratio of an output signal light is kept substantially constant.

39. An optical communication system according to claim 38,
wherein the signal/noise ratio of the signal light to be output from said second optical amplifying unit is controlled to be substantially constant irrespective of a noise amount caused in said first optical amplifying unit.

40. An optical communication system according to claim 38,
wherein the signal/noise ratio of the signal light to be output from said second optical amplifying unit is controlled to be substantially constant irrespective of the number of channel wavelengths of the signal light.

* * * * *

UNITED STATES PATENT AND TRADEMARK OFFICE
CERTIFICATE OF CORRECTION

PATENT NO.   : 6,462,861 B2
DATED        : October 8, 2002
INVENTOR(S)  : Chihiro Ohshima et al.

It is certified that error appears in the above-identified patent and that said Letters Patent is hereby corrected as shown below:

<u>Column 19,</u>
Line 50, after "to" insert -- said --.
Line 66, after "amplify" delete "the".

Signed and Sealed this

Eighth Day of April, 2003

JAMES E. ROGAN
*Director of the United States Patent and Trademark Office*